US011111972B2

United States Patent
Weiler et al.

(10) Patent No.: US 11,111,972 B2
(45) Date of Patent: Sep. 7, 2021

(54) METHOD FOR IDENTIFYING LEAKS BY MEANS OF AN ACTUATOR

(71) Applicant: Schaeffler Technologies AG & Co. KG, Herzogenaurach (DE)

(72) Inventors: Manuel Weiler, Lauf (DE); Roshan Willeke, Achern (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/630,300

(22) PCT Filed: Jul. 6, 2018

(86) PCT No.: PCT/DE2018/100620
§ 371 (c)(1),
(2) Date: Jan. 10, 2020

(87) PCT Pub. No.: WO2019/011375
PCT Pub. Date: Jan. 17, 2019

(65) Prior Publication Data
US 2020/0158190 A1    May 21, 2020

(30) Foreign Application Priority Data

Jul. 11, 2017    (DE) .......................... 102017115484.1

(51) Int. Cl.
*F16D 29/00* (2006.01)
*F16D 48/06* (2006.01)
(Continued)

(52) U.S. Cl.
CPC ......... *F16D 29/005* (2013.01); *F16D 48/066* (2013.01); *F16H 61/0031* (2013.01);
(Continued)

(58) Field of Classification Search
None
See application file for complete search history.

(56) References Cited

U.S. PATENT DOCUMENTS

2010/0151992 A1* 6/2010 Kramer ................... F16H 61/12
477/86
2011/0246038 A1* 10/2011 Trutschel ................ F16D 48/02
701/68

FOREIGN PATENT DOCUMENTS

CN    102656385 A    9/2012
CN    105270391 A    1/2016
(Continued)

*Primary Examiner* — Timothy Hannon
(74) *Attorney, Agent, or Firm* — Kevin L. Parks

(57) ABSTRACT

A method for controlling an actuator includes providing the actuator with a control unit, a drive unit including an electric motor with a stator and a rotor, a rotor position sensor, connected to the control unit, for detecting a rotation of the rotor, and a displacer unit, drivable by the rotation of the rotor, for displacing a fluid. The displacer unit includes a geometric displacement volume per revolution of the rotor. The method also includes generating a predetermined pressure at the displacer unit by applying an electrical driving power to the electric motor, maintaining the predetermined pressure over a predetermined time interval, determining the rotation of the rotor with the rotor position sensor during the predetermined time interval, and determining a leakage volume flow.

9 Claims, 1 Drawing Sheet

(51) Int. Cl.
  *F16H 61/00* (2006.01)
  *F16H 61/32* (2006.01)
(52) U.S. Cl.
  CPC ..... *F16H 61/32* (2013.01); *F16D 2500/1026* (2013.01); *F16D 2500/3024* (2013.01); *F16D 2500/3166* (2013.01); *F16D 2500/5016* (2013.01); *F16D 2500/7041* (2013.01); *F16D 2500/70217* (2013.01); *F16D 2500/70235* (2013.01)

(56) References Cited

FOREIGN PATENT DOCUMENTS

| | | |
|---|---|---|
| DE | 10344648 A1 | 4/2004 |
| DE | 102006061516 A1 | 6/2008 |
| DE | 102009055161 A1 | 6/2011 |
| DE | 102011102277 A1 | 11/2012 |
| DE | 102011105648 A1 | 12/2012 |
| DE | 102011117488 A1 | 5/2013 |
| DE | 102012010172 A1 | 11/2013 |
| DE | 102013005774 A1 | 10/2014 |
| DE | 112005000814 B4 | 11/2014 |
| DE | 102015204383 A1 | 9/2016 |
| DE | 102015214998 A1 | 2/2017 |
| DE | 102016219336 A1 | 4/2017 |
| DE | 102016222648 A1 | 6/2017 |
| WO | 2005064187 A1 | 7/2005 |
| WO | 2015067259 A1 | 5/2015 |
| WO | 2015090317 A1 | 6/2015 |
| WO | 2017054815 A1 | 4/2017 |

\* cited by examiner

METHOD FOR IDENTIFYING LEAKS BY MEANS OF AN ACTUATOR

CROSS-REFERENCE TO RELATED APPLICATIONS

This application is the United States National Phase of PCT Appln. No. PCT/DE2018/100620 filed Jul. 6, 2018, which claims priority to German Application No. DE102017115484.1 filed Jul. 11, 2017, the entire disclosures of which are incorporated by reference herein.

TECHNICAL FIELD

The disclosure relates to a method for controlling an actuator, in particular a hydrostatic actuator, preferably for a motor vehicle.

BACKGROUND

WO 2015/067259 A1 discloses a fluid assembly for actuating at least one motor vehicle component. The fluid assembly comprises an actuating system and a fluidic energy source, e.g. a fluid pump.

DE 10 2015 214 998 A1 discloses an actuating assembly in which a fluid pump driven by an electric motor is used to deliver a fluid in a hydraulic circuit with a first and a second delivery direction. By means of a valve assembly having a first operating position for the actuation of a clutch unit and a second operating position for the actuation of a load system, one fluid pump can be used to actuate the clutch unit and the load system. The load system can comprise a further clutch and a transmission assembly or parking lock, for example.

By means of the at least one displacer unit, a hydraulic circuit is supplied with a fluid (e.g. hydraulic fluid, in particular hydraulic oil), thus enabling the motor vehicle components, such as clutches, transmission etc., to be shifted or actuated. Here, control of the displacer unit should be as precise as possible, thus allowing rapid and reproducible actuation of the motor vehicle components. Furthermore, the control of the hydraulic circuit can vary over the time in operation, due to wear for example.

SUMMARY

The disclosure relates to a method for controlling an actuator, wherein the actuator has at least one drive unit with an electric motor and a control unit. The motor has at least one stator and one rotor, and rotation of the rotor can be detected by means of a rotor position sensor, which is connected to the control unit. The actuator has a displacer unit (e.g. a fluid pump), drivable by the rotation of the rotor, for displacing a fluid, wherein the displacer unit has a certain geometric displacement volume per revolution of the rotor. The method comprises at least the following steps:

a) generating a predetermined pressure at the displacer unit by applying an electrical driving power to the motor;

b) maintaining the predetermined pressure over a predetermined time interval;

c) determining the rotation of the rotor by means of the rotor position sensor within the time interval and determining a leakage volume flow.

In particular, the motor is connected to the displacer unit directly or via a transmission (with a transmission ratio, in particular a constant transmission ratio). The rotor position sensor detects the rotation of the rotor, e.g. in increments. The number of increments for each complete revolution is dependent on the construction of the electric motor. The rotation of the rotor drives the displacer unit, with the result that a fluid is delivered by the displacer unit. The fluid delivered is used in the hydraulic circuit to actuate the motor vehicle components (clutches, transmission etc.).

The displacer unit has a certain geometric displacement volume (volume per revolution of the rotor). Given a knowledge of the rotation of the rotor, i.e. a knowledge of the number of increments determined during rotation, the fluid delivered can thus be determined.

In step a) of the method, a predetermined pressure is set at the displacer unit. This can be determined, for example, in the hydraulic circuit, e.g. by means of a pressure sensor. The pressure can also be determined indirectly, e.g. via control of a kiss point of a clutch. At the kiss point of a clutch, the friction partners arranged opposite one another are brought into contact with one another to an extent such that torque transmission just begins or just fails to begin. The pressure is set and regulated by means of an electrical driving power of the motor.

In step b) of the method, the predetermined pressure is maintained for a predetermined time interval (e.g. at least 0.5 seconds, preferably at least 1 second). The predetermined pressure should be maintained with a deviation of at most 0.2 bar, in particular at most 0.1 bar, within the time interval.

In step c), rotation of the rotor is monitored and evaluated by means of the rotor position sensor in the time interval, i.e., the increments performed within the time interval are determined. If, therefore, rotation of the rotor is required to maintain the pressure, leakage at the displacer unit and/or in the hydraulic circuit can be assumed. A leakage volume flow can be determined via the rotation of the rotor.

The leakage volume flow thus determined can be taken into account for improved control of the actuator by the control unit in the actuation of the actuator. Thus, for example, volume flow control, in which the actuator is controlled by controlling the delivery volume of the displacer unit, can be performed more accurately. Furthermore, a state of the actuator can be monitored via a change in the leakage volume flow. A change in the leakage volume flow (at the predetermined pressure) can indicate wear of the actuator or of components in the hydraulic circuit.

The leakage volume flow can be determined in accordance with the following formula:

$$Q_L = \text{delta}INC \cdot V_g / (INC/\text{rotation})/t$$

where $Q_L$: leakage volume flow in liters/second;

deltaINC: ($INC_{END} - INC_{START}$): number of increments performed by the rotor in time interval t;

$V_g$: geometric displacement volume of the displacer unit per revolution of the rotor in liters/revolution; and t: time interval in seconds.

The method can be carried out at different predetermined pressures. These predetermined pressures are selected in such a way that a leakage volume flow can be determined or at least estimated for the pressure range encountered during the operation of the actuator.

It is possible, by determining the leakage volume flow at at least one predetermined pressure or at different predetermined pressures, to determine a characteristic map for the leakage volume flow for different pressures. This characteristic map can be considered in the actuation of the actuator. In particular, the characteristic map is stored in the control unit, thus allowing actuation of the motor vehicle components in a manner matched to the state of the actuator.

The determined leakage volume flow is considered in volume flow control of the displacer unit for the control of the actuator.

The method can be carried out continuously or periodically. Here, continuously means that the method is carried out at least once each time the actuator is operated. Operation of the actuator is coupled to the operation of the motor vehicle (actuation of an ignition system etc.), for example. In contrast to continuously, periodically means that the method is carried out at definable intervals. The intervals can be determined as a function of time, of the operating time of the actuator or of the motor vehicle, or of the mode of operation or the loading of the actuator etc. In particular, the intervals can be varied as a function of a change in the leakage volume flow, for example. If, for example, an increase in the leakage volume flow is ascertained, the following intervals can be shortened.

A motor vehicle having an actuator and at least one motor vehicle component, which can be actuated by the actuator is furthermore proposed; wherein the actuator has at least one drive unit with an electric motor and a control unit. The motor has at least one stator and one rotor, and rotation of the rotor can be detected by means of a rotor position sensor, which is connected to the control unit. The actuator has a displacer unit (e.g. a fluid pump), drivable by the rotation of the rotor, for displacing a fluid, wherein the displacer unit has a certain geometric displacement volume per revolution of the rotor. The motor vehicle is set up and embodied for carrying out the method described above.

As a precaution, it should be mentioned that the ordinals used here ("first", "second" . . . ) serve primarily (merely) to distinguish the number of similar objects, variables or processes, that is to say, do not necessarily specify any dependence and/or sequence of these objects, variables or processes. If any dependence and/or sequence is required, this is indicated specifically here, or it is obvious for a person skilled in the art in studying the embodiment specifically described.

BRIEF DESCRIPTION OF THE DRAWINGS

The disclosure and the technical environment are explained in greater detail below by means of the figures. It should be noted that there is no intention to restrict the invention by the illustrative embodiments shown. Unless explicitly stated otherwise, it is also possible to isolate partial aspects of the situations explained in the figures and to combine them with other components and insights from the present description and/or figures. It should be noted that the figures and especially the size relationships illustrated are only schematic. Identical reference signs denote identical objects, and therefore supplementary explanations from different figures can be drawn upon if appropriate. In the drawings.

DETAILED DESCRIPTION

Figure 1:
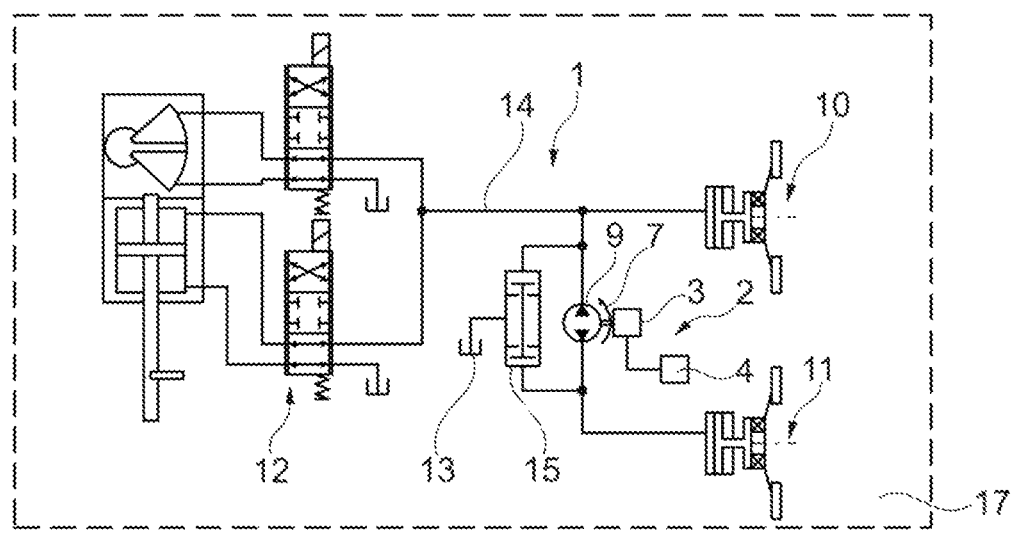
FIG. 1 shows an actuator with a plurality of motor vehicle components.
Figure 3:
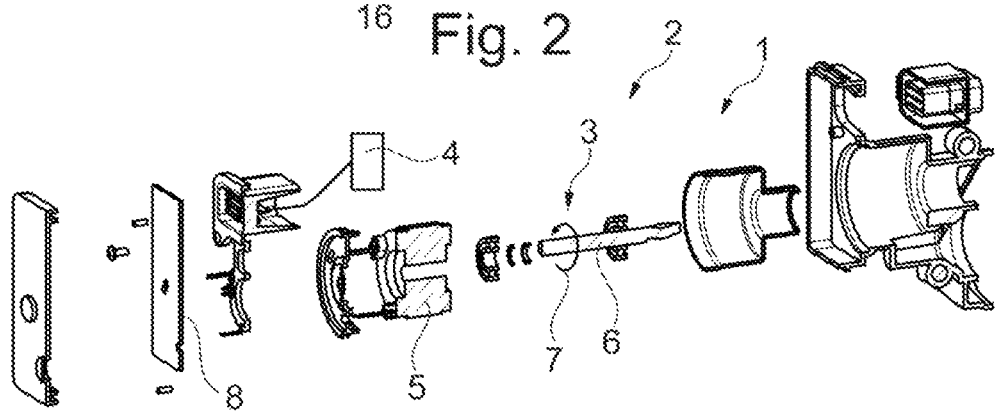
FIG. 3 shows another part of an actuator in an exploded perspective view.

FIG. 1 shows an actuator 1 with a plurality of motor vehicle components 10, 11, 12. The actuator 1 has a drive unit 2 with an electric motor 3, which comprises a rotor 6 (ref. FIG. 3), and a control unit 4. The actuator 1 has a displacer unit 9 (e.g. a fluid pump), drivable by the rotation 7 of the rotor 6, for displacing a fluid, wherein the displacer unit 9 has a certain geometric displacement volume per revolution of the rotor 6. The hydraulic circuit 14 of the actuator comprises a reservoir 13 for the fluid and a valve assembly 15 for actuating the motor vehicle components 10, 11, 12. Here, the first motor vehicle component 10 and the second motor vehicle component 11 are each illustrated as clutches. Here, the third motor vehicle component 12 is a transmission assembly. The valve assembly 15 is a "two pressure valve", which ensures in a simple manner that a pressure can only be applied in one delivery direction of the displacer unit 9 and that a switch can be made to the other delivery direction after the dissipation of this pressure.

Figure 2:
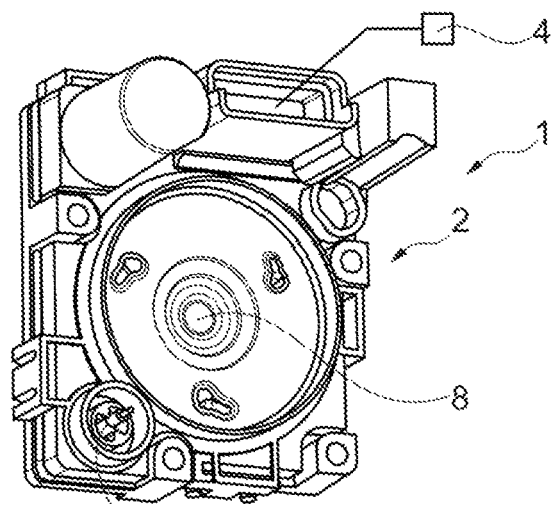
FIG. 2 shows part of an actuator in a perspective view.

In step a) of the method, a predetermined pressure is set at the displacer unit 9. This can be determined, for example, in the hydraulic circuit 14, e.g. by means of the pressure sensor 16 (ref. FIG. 2). The pressure is set and regulated by means of an electrical driving power of the motor 3.

In step b) of the method, the predetermined pressure is maintained for a predetermined time interval.

In step c), rotation 7 of the rotor 6 is monitored and evaluated by the rotor position sensor 8 in the time interval, i.e. the increments performed within the time interval are determined. If, therefore, rotation 7 of the rotor 6 is required to maintain the pressure, leakage at the displacer unit 9 and/or in the hydraulic circuit 14 can be assumed. A leakage volume flow can be determined via the rotation 7 of the rotor 6.

The leakage volume flow thus determined can be taken into account for improved control of the actuator 1 by the control unit 4 in the actuation of the actuator 1. Thus, for example, volume flow control, in which the actuator 1 is controlled by controlling the delivery volume of the displacer unit 9, can be performed more accurately. Furthermore, a state of the actuator 1 can be monitored via a change in the leakage volume flow. A change in the leakage volume flow (at the predetermined pressure) can indicate wear of the actuator 1 or of components in the hydraulic circuit 14 (e.g. valve assembly 15, motor vehicle components 10, 11, 12 etc.).

FIG. 2 shows part of an actuator 1 in perspective view. The actuator 1 has a drive unit 2 with an electric motor 3 (ref. FIG. 3) and a control unit 4. The motor 3 has at least one stator 5 and one rotor 6 (see FIG. 3), and rotation 7 of the rotor 6 can be detected by means of a rotor position sensor 8, which is connected to the control unit 4. A pressure applied to the displacer unit 9 (and/or a pressure in the hydraulic circuit) can be ascertained by means of a pressure sensor 16.

FIG. 3 shows another part of an actuator 1 in an exploded perspective view. The actuator 1 has a drive unit 2 with an electric motor 3 and a control unit 4. The motor 3 has at least one stator 5 and one rotor 6, and rotation 7 of the rotor 6 can be detected by means of a rotor position sensor 8, which is connected to the control unit 4.

REFERENCE NUMERALS 1 actuator
2 drive unit
3 motor
4 control unit
5 stator
6 rotor 7 rotation
8 rotor position sensor
9 displacer unit
10 first motor vehicle component
11 second motor vehicle component
12 third motor vehicle component
13 reservoir
14 hydraulic circuit
15 valve assembly
16 pressure sensor
17 motor vehicle

The invention claimed is:

1. A method for controlling an actuator, comprising:
providing the actuator comprising:
  a control unit;
  a drive unit comprising an electric motor including a stator and a rotor;
  a rotor position sensor, connected to the control unit, for detecting a rotation of the rotor; and
  a displacer unit, drivable by the rotation of the rotor, for displacing a fluid, the displacer unit comprising a geometric displacement volume per revolution of the rotor;
generating a predetermined pressure at the displacer unit by applying an electrical driving power to the electric motor;
maintaining the predetermined pressure over a predetermined time interval;
determining the rotation of the rotor with the rotor position sensor during the predetermined time interval; and
determining a leakage volume flow.

2. The method of claim 1, wherein the leakage volume flow is determined in accordance with the formula: $QL = deltaINC * Vg/(INC/rotation)/t$, wherein:
  QL is the leakage volume flow measured in liters/second;
  deltaINC is a number of increments performed by the rotor in the predetermined time interval; and
  Vg is the geometric displacement volume per revolution of the rotor measured in liters/revolution;
  INC/rotation is a number of increments per revolution of the rotor; and
  t is the predetermined time interval in seconds.

3. The method of claim 1, wherein the method is carried out at different predetermined pressures.

4. The method of claim 1, wherein the leakage volume flow is considered in volume flow control of the displacer unit by the actuator.

5. The method of claim 1, wherein a characteristic map for the leakage volume flow for different pressures is determined by determining the leakage volume flow at the predetermined pressure.

6. The method of claim 1, wherein the method is carried out continuously or periodically.

7. The method of claim 1, wherein the leakage volume flow is determined in accordance with the formula: $QL = deltaINC * Vg/(INC/rotation)/t$, wherein:
  QL is the leakage volume flow;
  deltaINC is a number of increments performed by the rotor in the predetermined time interval;
  Vg is the geometric displacement volume per revolution of the rotor;
  INC/rotation is a number of increments per revolution of the rotor; and
  t is the predetermined time interval.

8. A motor vehicle, comprising:
an actuator comprising:
  a control unit;
  a drive unit comprising an electric motor including a stator and a rotor;
  a rotor position sensor, connected to the control unit, for detecting a rotation of the rotor; and
  a displacer unit, drivable by the rotation of the rotor, for displacing a fluid, the displacer unit comprising a geometric displacement volume per revolution of the rotor; and
a motor vehicle component, actuatable by the actuator, wherein the actuator is arranged to:
  generate a predetermined pressure at the displacer unit when an electrical driving power is applied to the electric motor;
  maintain the predetermined pressure over a predetermined time interval;
  determine the rotation of the rotor with the rotor position sensor during the predetermined time interval; and
  determine a leakage volume flow.

9. The motor vehicle of claim 8 wherein the motor vehicle component is a clutch or a transmission assembly.

* * * * *